(12) United States Patent
Nakamura

(10) Patent No.: US 9,437,332 B2
(45) Date of Patent: Sep. 6, 2016

(54) NUCLEAR FUEL STORAGE RACK

(75) Inventor: Masaaki Nakamura, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 252 days.

(21) Appl. No.: 13/812,773

(22) PCT Filed: Nov. 29, 2011

(86) PCT No.: PCT/JP2011/077547
§ 371 (c)(1),
(2), (4) Date: Jan. 28, 2013

(87) PCT Pub. No.: WO2012/105119
PCT Pub. Date: Aug. 9, 2012

(65) Prior Publication Data
US 2013/0129033 A1    May 23, 2013

(30) Foreign Application Priority Data

Feb. 4, 2011    (JP) .................................. 2011-022623

(51) Int. Cl.
*G21C 19/00* (2006.01)
*G21C 19/07* (2006.01)
*G21F 9/36* (2006.01)

(52) U.S. Cl.
CPC ................. *G21C 19/07* (2013.01); *G21F 9/36* (2013.01)

(58) Field of Classification Search
CPC ..... G21D 10/003; G21C 19/07; G21C 19/40
USPC ............................ 376/272; 250/506.1, 507.1
See application file for complete search history.

(56) References Cited

U.S. PATENT DOCUMENTS 1,122,350 A * 12/1914 Wysong ........................... 52/436
4,326,130 A *  4/1982 Ahner ...................... G21F 5/10
                                                     250/506.1

(Continued)

FOREIGN PATENT DOCUMENTS

JP    53-023899 A    2/1978
JP    54-045497 A    4/1979

(Continued)

OTHER PUBLICATIONS

International Search Report for PCT/JP2011/077547, mailing date of Mar. 6, 2012.

(Continued)

*Primary Examiner* — Jack W Keith
*Assistant Examiner* — Sharon M Davis
(74) *Attorney, Agent, or Firm* — Westerman, Hattori, Daniels & Adrian, LLP

(57) ABSTRACT

In a nuclear fuel storage rack including a plurality of rack cells (1) configured to house a nuclear fuel assembly, the rack cell (1) includes a plurality of plate members (10 to 13) containing a radiation absorption material and stood to form a nuclear fuel housing space (8) configured to house the nuclear fuel assembly, and a fastening unit (14) configured to fasten the plurality of plate members (10 to 13). Each of the plate members (10 to 13) includes projections (16) protruding outward in a lateral direction from one side end and the other side end extending in an upward/downward direction (T1), and concave sections (17) formed at one side end side and the other side by the projections (16). The projections (16) protruding outward from outer surfaces of the plate members (10 to 13) in the lateral direction are fastened by the fastening unit (14).

3 Claims, 15 Drawing Sheets

(56) References Cited

U.S. PATENT DOCUMENTS

| | | | | |
|---|---|---|---|---|
| 6,118,838 | A * | 9/2000 | Robert et al. | 376/272 |
| 6,577,699 | B1 * | 6/2003 | Minshall | 376/272 |
| 8,848,853 | B2 * | 9/2014 | Foussard et al. | 376/272 |
| 2003/0174801 | A1 * | 9/2003 | Costas de la Pena et al. | 376/272 |
| 2004/0022345 | A1 * | 2/2004 | Hermouet et al. | 376/272 |

FOREIGN PATENT DOCUMENTS

| | | |
|---|---|---|
| JP | 63-159794 A | 7/1988 |
| JP | 11-064572 A | 3/1999 |
| JP | 2001-183491 A | 7/2001 |
| JP | 2001-281392 A | 10/2001 |
| JP | 2002-189098 A | 7/2002 |
| JP | 2003-500668 A | 1/2003 |
| JP | 2010-014681 A | 1/2010 |
| JP | 2010-025701 A | 2/2010 |
| JP | 2010-060531 JP | 3/2010 |
| WO | 2010/000846 A1 | 1/2010 |

OTHER PUBLICATIONS

Written Opinion of PCT/JP2011/077547, mailing date of Mar. 6, 2012.

* cited by examiner

NUCLEAR FUEL STORAGE RACK

TECHNICAL FIELD

The present invention relates to a nuclear fuel storage rack stored in water in a storage pit of a nuclear fuel storage facility in a state in which a nuclear fuel assembly is housed.

This application claims priority to and the benefit of Japanese Patent Application No. 2011-022623 filed on Feb. 4, 2011, the disclosure of which is incorporated by reference herein.

BACKGROUND ART

For example, a spent nuclear fuel (a spent nuclear fuel rod) generated in a nuclear power plant is stored and preserved in a nuclear fuel storage facility. In addition, the spent nuclear fuel is housed in a rack cell of a fuel storage rack as a nuclear fuel assembly bundled by a grid, and stored in a storage pit of a nuclear fuel storage facility. Here, water is stored in the storage pit, and a plurality of nuclear fuel storage racks are arranged and stored in the water. Accordingly, decay heat is cooled and removed to be maintained at a value less than critical value, and radiation is shielded.

The nuclear fuel storage rack is configured such that a plurality of rack cells extending in an upward/downward direction and arranged in vertical and horizontal directions are formed. For example, the nuclear fuel storage rack is manufactured by disposing boron-added stainless steel plates in a square lattice shape and welding and connecting neighboring steel plates, or manufactured by disposing prismatic bodies of boron-added stainless steel pipes in a zigzag shape and welding and connecting corner sections of the neighboring prismatic bodies (for example, see Patent Document 1).

PRIOR ART

Patent Document

[Patent Document 1]: Japanese Unexamined Patent Application, First Publication No. 2002-189098

SUMMARY OF THE INVENTION

Problems to be Solved by the Invention

However, the fuel storage rack in the related art is formed by welding and connecting plates or prismatic bodies formed of boron-added stainless steel. For this reason, there is a concern that distortion may occur due to heat upon welding, and quality such as shielding performance of radiation may be decreased. In addition, in Europe, manufacture of the fuel storage rack by welding boron-added stainless steel having neutron absorption performance is prohibited.

For this reason, it is very preferable for the fuel storage rack to be manufactured without welding.

Means for Solving the Problems

According to an aspect of the present invention, a nuclear fuel storage rack includes a plurality of rack cells configured to house a nuclear fuel assembly, and the rack cell includes a plurality of plate members containing a radiation absorption material and configured to form a nuclear fuel housing space configured to house the nuclear fuel assembly, and a fastening mechanism configured to fasten the plurality of plate members. In addition, the plate members include projections protruding outward in a lateral direction from one sides (one end edge) and the other sides (the other end edge) extending in an upward/downward direction, and concave sections formed at one sides (one end edge) and the other sides (the other end edge) by the projections. In addition, in a state in which the projections and the concave sections of the neighboring plate members are engaged to assemble the plurality of plate members, the fastening mechanism is configured to fasten the projections protruding outward from outer surfaces of the plate members in the lateral direction.

In one aspect of the present invention, the projections and the concave sections of the plate members (sidewall plates) are engaged, and the projections protruding outward from the outer surfaces of the plate members are fastened by the fastening mechanism. For this reason, the rack cell can be formed without the use of welding.

Effects of the Invention

In the nuclear fuel storage rack according to an aspect of the present invention, the rack cell can be formed by engaging the projections and the concave sections of the plate members and connecting the projections protruding outward from the outer surfaces of the plate members using the fastening mechanism without welding. For this reason, like the related art, concern of causing distortion due to the welding and a decrease in quality such as shielding performance of radiation can be removed. As a result, the nuclear fuel storage rack having high reliability can be realized.

In addition, the rack cell is formed by engaging and assembling the projections and the concave sections of the plate members and protruding the projections outward from the outer surfaces of the plate members. For this reason, in a state in which the nuclear fuel storage rack is stored in water, the water can be interposed between the neighboring rack cells as a moderator for moderating fast neutrons. Accordingly, not only can the neutrons be absorbed in the radiation absorption material of the plate members of the rack cell, but also the fast neutrons can be moderated using the water as a water trap. As a result, critical safety can be secured.

EMBODIMENTS OF THE INVENTION

Hereinafter, a nuclear fuel storage rack according to a first embodiment of the present invention will be described with reference to FIGS. 1 to 4. In the embodiment, for example, the present invention relates to a nuclear fuel storage rack configured to store and preserve a spent nuclear fuel generated in a nuclear power plant in water in a storage pit of a nuclear fuel storage facility.

Figure 1:
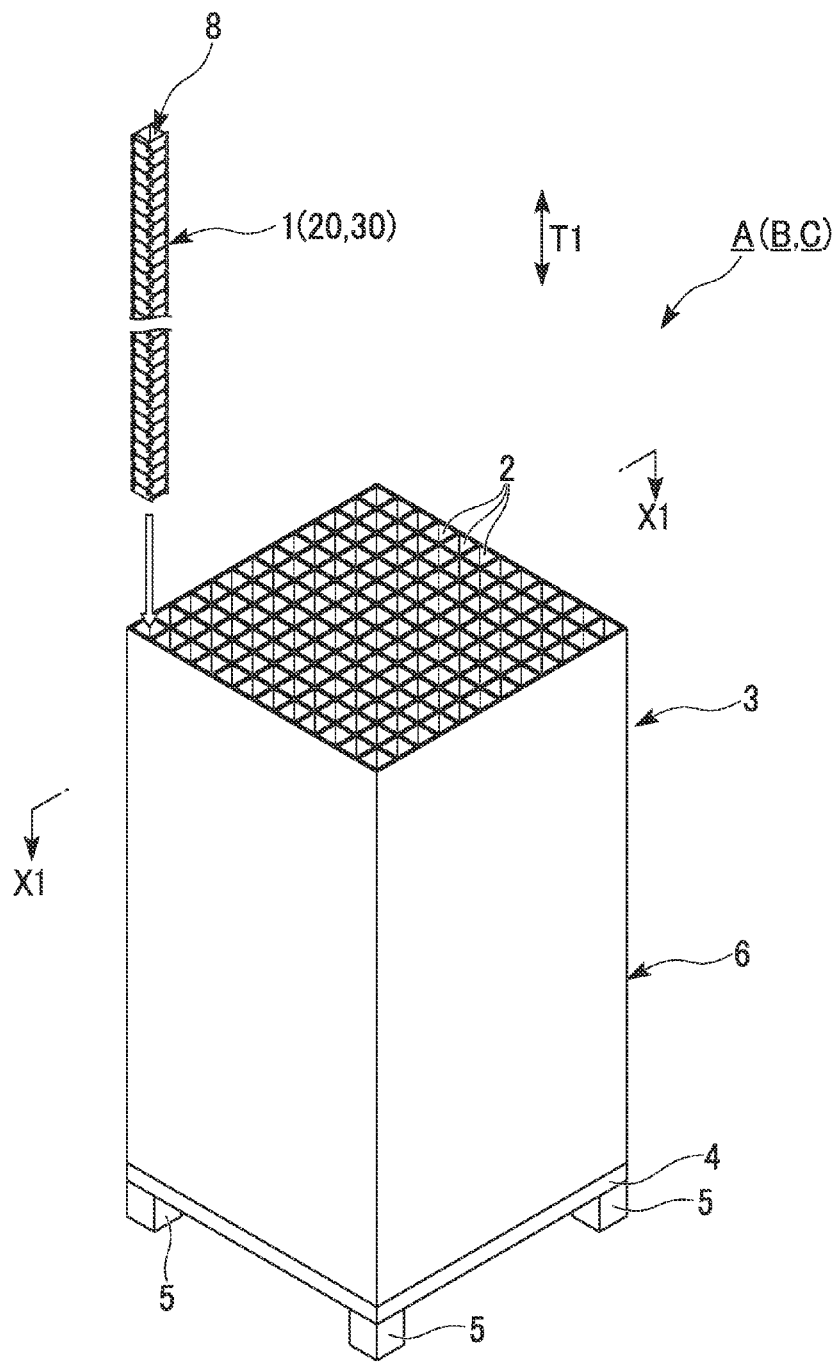
FIG. 1 is a perspective view showing a nuclear fuel storage rack according to first to third embodiments of the present invention.
Figure 2:
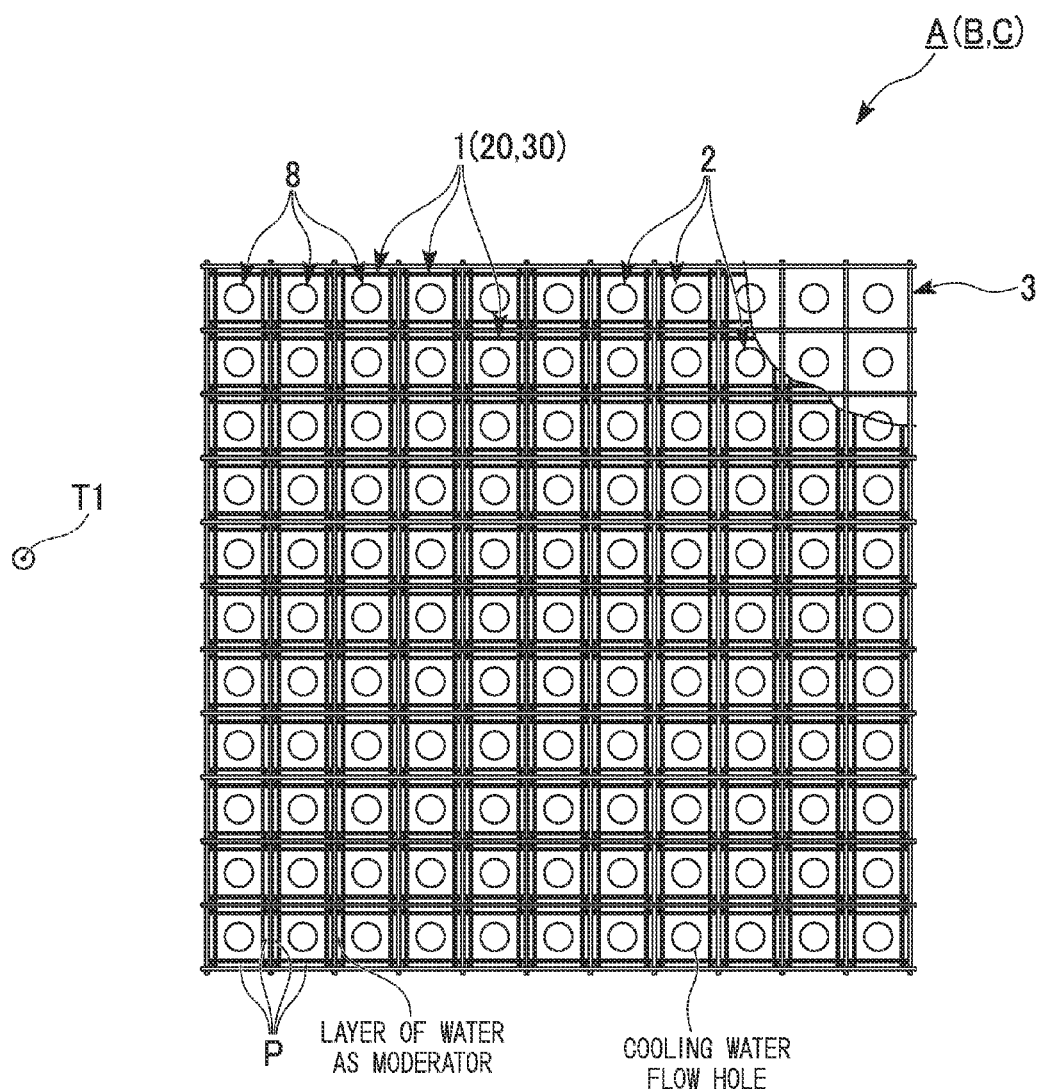
FIG. 2 is a plan view showing the nuclear fuel storage rack according to the first to third embodiments of the present invention taken along line X1-X1 of FIG. 1.

As shown in FIGS. 1 and 2, a nuclear fuel storage rack A of the embodiment includes a rack cell 1 configured to house a nuclear fuel assembly, and a rack body 3 having a cell insertion hole 2 configured to house the rack cell 1.

As shown in FIG. 1, the rack body 3 includes a base plate 4 having a square plate shape, a plurality of support legs 5 protruding downward from a lower surface of the base plate 4, and a cell housing section 6 integrally installed on the base plate 4 and formed by arranging a plurality of cell insertion holes 2 having a cross-sectional square shape extending in an upward/downward direction longitudinally and laterally in a horizontal direction (a lateral direction). In addition, for example, the plurality of cell insertion holes 2 having a cross-sectional square shape arranged longitudinally and laterally in the horizontal direction are formed at the cell housing section 6 by assembling the plate members formed of stainless steel plates in a lattice shape. Here, the cell housing section 6 may be formed of an extremely thin plate while securing earthquake resistance.

Figure 3:
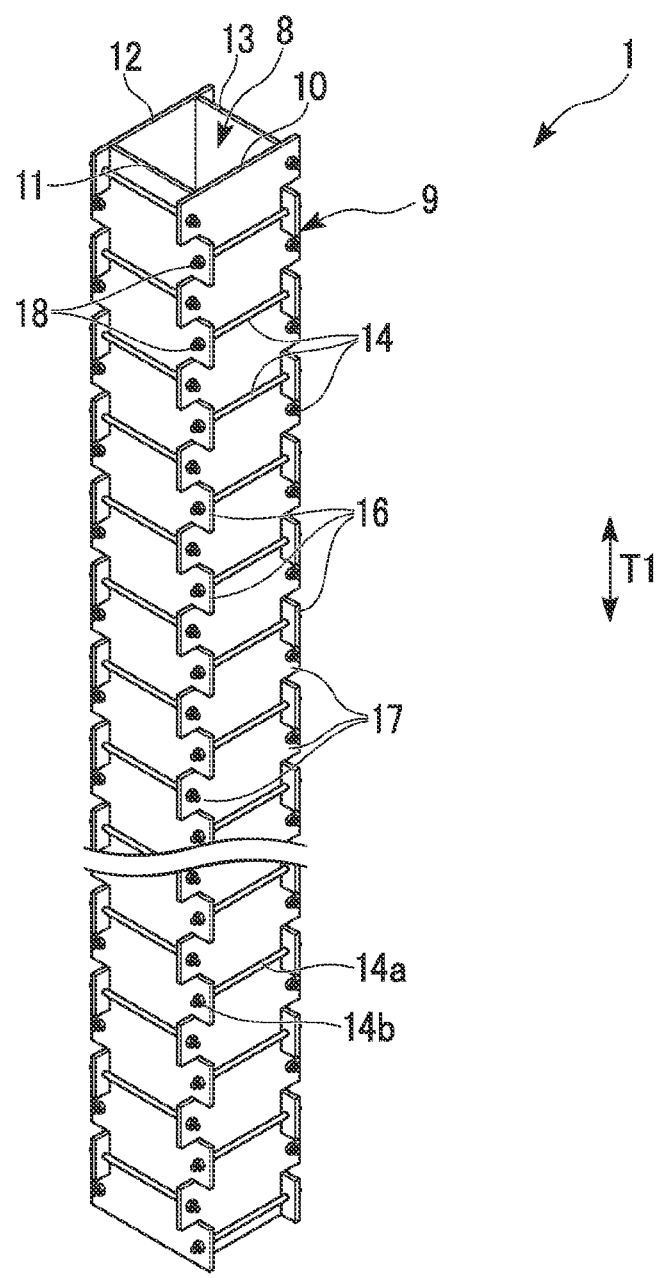
FIG. 3 is a perspective view showing a rack cell of the nuclear fuel storage rack according to the first embodiment of the present invention.
Figure 4:
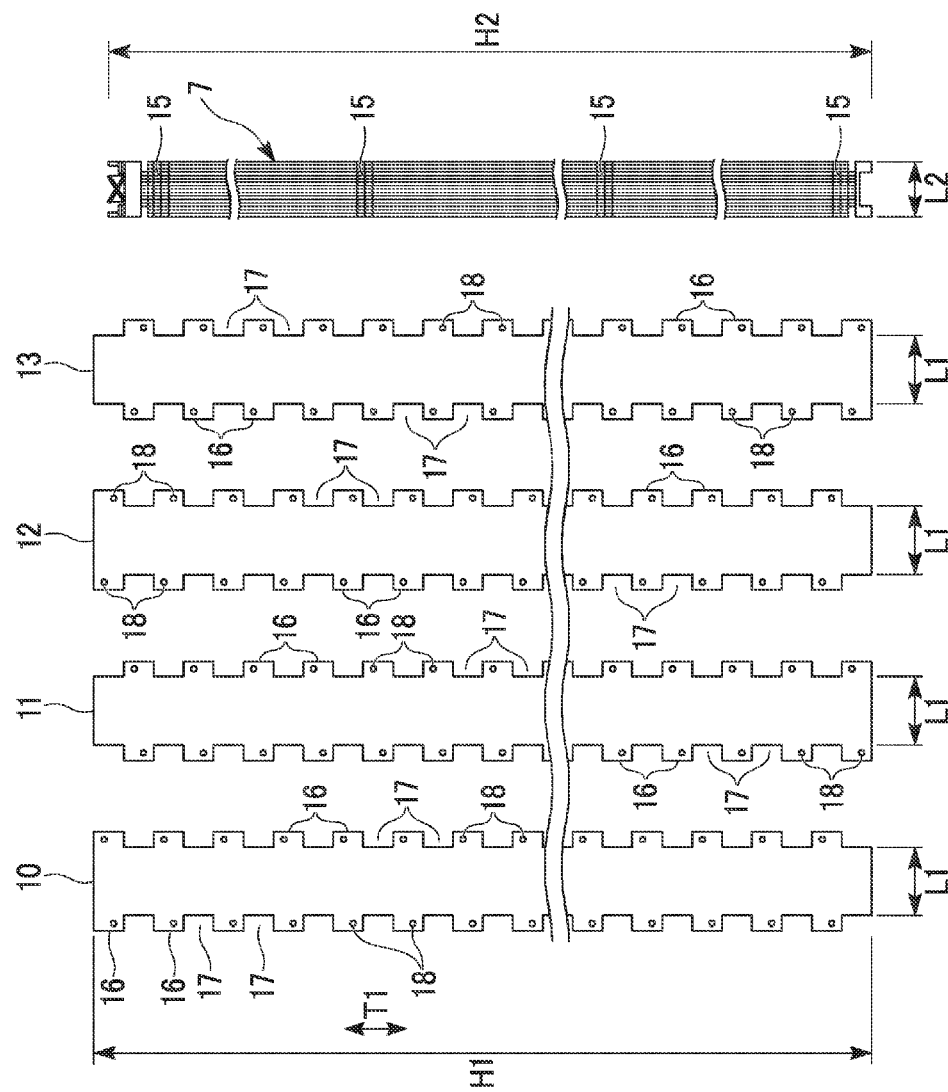
FIG. 4 is a front view showing a sidewall plate (a plate member) and a nuclear fuel assembly of the rack cell of the nuclear fuel storage rack according to the first embodiment of the present invention.

As shown in FIGS. 3 and 4, the rack cell 1 of the embodiment includes a cell body 9 constituted by a plurality of sidewall plates (plate members) 10, 11, 12 and 13 stood to form a nuclear fuel housing space (a housing section) 8 configured to house a nuclear fuel assembly 7, and a fastening mechanism 14 configured to fasten the plurality of sidewall plates 10 to 13 of the cell body 9.

A nuclear fuel used in a pressurized-water type nuclear power equipment, in particular, the nuclear fuel assembly 7 in which the plurality of nuclear fuel rods are bundled by a grid 15, has a square rod shape (see FIG. 4). For this reason, the cell body 9 is formed by using four sidewall plates 10 to 13, and the nuclear fuel housing space 8 has a cross-sectional square shape.

The sidewall plates 10 to 13 are formed by using a material having good neutron absorption performance (a radiation absorption material) such as boron-added stainless steel, boron (boron carbide)-added aluminum, a gadolinium-added ferroalloy or nonferrous metal, or a boron- and gadolinium-added ferroalloy or nonferrous metal.

The sidewall plates 10 to 13 of the embodiment are formed by projections 16 protruding outward in a lateral direction from one side end along an inner surface and an outer surface (one surface and the other surface) at the one side end extending in an upward/downward direction T1, and forming projections 16 protruding outward in the lateral direction from the other side end along the inner surface and the outer surface even at the other side end In the embodiment, the sidewall plates 10 to 13 are formed by installing the plurality of projections 16 at one side and the other side in the upward/downward direction T1 at predetermined intervals. That is, the sidewall plates 10 to 13 are formed by including the projections 16 and concave sections 17 alternately disposed in the upward/downward direction T1 at one side end and the other side end The sidewall plates 10 to 13 are formed such that the pair of projections 16 of one side and the other side are disposed at the same height in the upward/downward direction T1. In addition, among the four sidewall plates 10 to 13, a first sidewall plate 10 and a second sidewall plate 12 are formed to dispose the projections 16 (and the concave sections 17) at the same height in the upward/downward direction T1. A third sidewall plate 11 and a fourth sidewall plate 13 are formed to dispose the projections 16 (and the concave sections 17) at the same height in the upward/downward direction T1. In addition, the third sidewall plate 11 and the fourth sidewall plate 13 are formed such that the projections 16 are disposed at the height of the concave sections 17 of the first and second sidewall plates 10 and 12. That is, the first and second sidewall plates 10 and 12, and the third and fourth sidewall plates 11 and 13 are formed to slide disposition of the projection 16 and the concave section 17.

Insertion holes 18 passing through the outer surface from the inner surface are formed at predetermined positions of the projections 16 of the sidewall plates 10 to 13. Furthermore, the sidewall plates 10 to 13 are formed such that a width L1 from one side end to the other side end is slightly larger than a width L2 of the nuclear fuel assembly 7 having a cross-sectional square shape, and a height H1 from a lower end to an upper end is larger than a height H2 of the nuclear fuel assembly 7.

Then, the cell body 9 engages the projections 16 and the concave sections 17 disposed at the same height position of one side of the first sidewall plate 10 and the other side of the third sidewall plate 11, and engages the projections 16 and the concave sections 17 disposed at the same height as the other side of the first sidewall plate 10 and one side of the fourth sidewall plate 13. In addition, the cell body 9 engages the projections 16 and the concave sections 17 disposed at the same height as one side of the second sidewall plate 12 and the other side of the fourth sidewall plate 13, and engages the projections 16 and the concave sections 17 disposed at the same height as the other side of the second sidewall plate 12 and one side of the third sidewall plate 11. Then, the neighboring sidewall plates 10 and 11, 11 and 12, 12 and 13, and 13 and 10 are perpendicular to each other, and the projections 16 and the concave sections 17 are engaged with each other as described above, assembling the four sidewall plates 10 to 13. Accordingly, the nuclear fuel housing space 8 having a cross-sectional square shape is formed.

The fastening mechanism 14 is a fastener configured to integrally fix the four assembled sidewall plates 10 to 13. Then, in the embodiment, bolts 14a and nuts 14b are used as the fastening mechanism 14. In a state in which the four sidewall plates 10 to 13 are assembled, the bolts 14a are inserted into the insertion holes 18 of the pair of projections 16 opposite each other at the same height as the first sidewall plate 10 and the second sidewall plate 12 and the insertion holes 18 of the pair of projections 16 opposite to each other at the same height as the third sidewall plate 11 and the fourth sidewall plate 13, and the nuts 14b are fastened thereto. Accordingly, the projections 16 of the first sidewall plate 10 and the second sidewall plate 12, and the projections 16 of the third sidewall plate 11 and the fourth sidewall plate 13 are fastened (connected) by the fastening mechanism 14. As a result, the four sidewall plates 10 to 13 configured to form the nuclear fuel housing space 8 having a cross-sectional square shape are securely and rigidly integrated, and the rack cell 1 is formed.

In the nuclear fuel storage rack A of the embodiment, in a state in which the nuclear fuel assembly 7 is housed in the nuclear fuel housing space 8 of the rack cell 1 and the rack cell 1 is housed in the cell insertion hole 2 of the rack body 3, they are stored and preserved in water (boric acid solution or pure water) in the storage pit of the nuclear fuel storage facility. Then, here, the rack cell 1 is formed without use of welding. For this reason, there is no concern of generation of distortion due to welding and a decrease in quality such as shielding performance of radiation as in the related art.

As shown in FIG. 2, the rack cell 1 is formed in a state in which the projections 16 and the concave sections 17 of the sidewall plates 10 to 13 are engaged and the projections 16 protrude outward from the outer surfaces of the sidewall plates 10 to 13. For this reason, in a state in which the rack cell 1 is housed in the cell insertion hole 2 of the rack body 3, a space P is formed between outer surfaces of the sidewall plates 10 to 13 and inner surfaces of the cell insertion hole 2 by the projections 16 of the sidewall plates 10 to 13. For this reason, in a state in which the rack cell 1 is housed in the cell insertion hole 2 of the rack body 3 and stored in water, the nuclear fuel housing space 8 of the rack cell 1 is filled with water, and the space P between the outer surfaces of the sidewall plates 10 to 13 and the inner surfaces of the cell insertion hole 2 is also filled with water.

The nuclear fuel housing space 8 of the rack cell 1 and the space P between the outer surfaces of the sidewall plates 10 to 13 and the inner surfaces of the cell insertion holes 2 are filled with water. Accordingly, the fast neutrons discharged from the nuclear fuel assembly 7 are moderated to be converted into thermal neutrons, and the neutrons are absorbed by a radiation absorption material such as boron or gadolinium added to the sidewall plates 10 to 13. Since the radiation absorption material having the above-mentioned configuration effectively absorbs the neutrons, a storage interval of the nuclear fuel assembly 7 can be reduced, and the nuclear fuel can be densely stored.

The space P between the outer surfaces of the sidewall plates 10 to 13 and the inner surfaces of the cell insertion holes 2 is filled with water. Accordingly, water is interposed in the space P between the neighboring rack cells 1 inserted into the cell insertion holes 2 of the rack body 3 as the moderator (radiation moderator) configured to moderate the fast neutrons. Then, the neutrons are absorbed by the radiation absorption material of the sidewall plates 10 to 13 of the rack cell 1, and the fast neutrons are moderated by the water (water trap). As a result, an influence of the fast neutrons on the nuclear fuel housed in the neighboring rack cells 1 to a critical value is securely prevented.

Accordingly, in the nuclear fuel storage rack A of the embodiment, the rack cell 1 can be formed by engaging the projections 16 and the concave sections 17 of the sidewall plates 10 to 13 and connecting the projections 16 protruding outward from the outer surfaces of the sidewall plates 10 to 13 using the fastening mechanism 14, without use of the welding. For this reason, concern of distortion being generated due to the welding and a decrease in quality such as shielding performance of radiation like the related art can be removed. Accordingly, the nuclear fuel storage rack A having high reliability can be realized.

In addition, the rack cell 1 is formed by engaging and assembling the projections 16 and the concave sections 17 of the sidewall plates 10 to 13 and protruding the projections 16 outward from the outer surfaces of the sidewall plates 10 to 13. For this reason, in a state in which the rack cell 1 is housed in the nuclear fuel storage rack A and stored in water, the water as the moderator for moderating the fast neutrons can be disposed in the space P between the neighboring rack cells 1. Accordingly, the neutrons can be absorbed by the radiation absorption material of the sidewall plates 10 to 13 of the rack cell 1, and the fast neutron can be moderated using the water as the water trap. As a result, the critical safety can be secured.

Next, a nuclear fuel storage rack according to a second embodiment of the present invention will be described with reference to FIGS. 1, 2, 5 and 6. In the embodiment, only the configuration of the rack cell is different from the first embodiment. Accordingly, in the embodiment, the same elements as in the first embodiment are designated by the same reference numerals, and detailed description thereof will be omitted.

Figure 5:
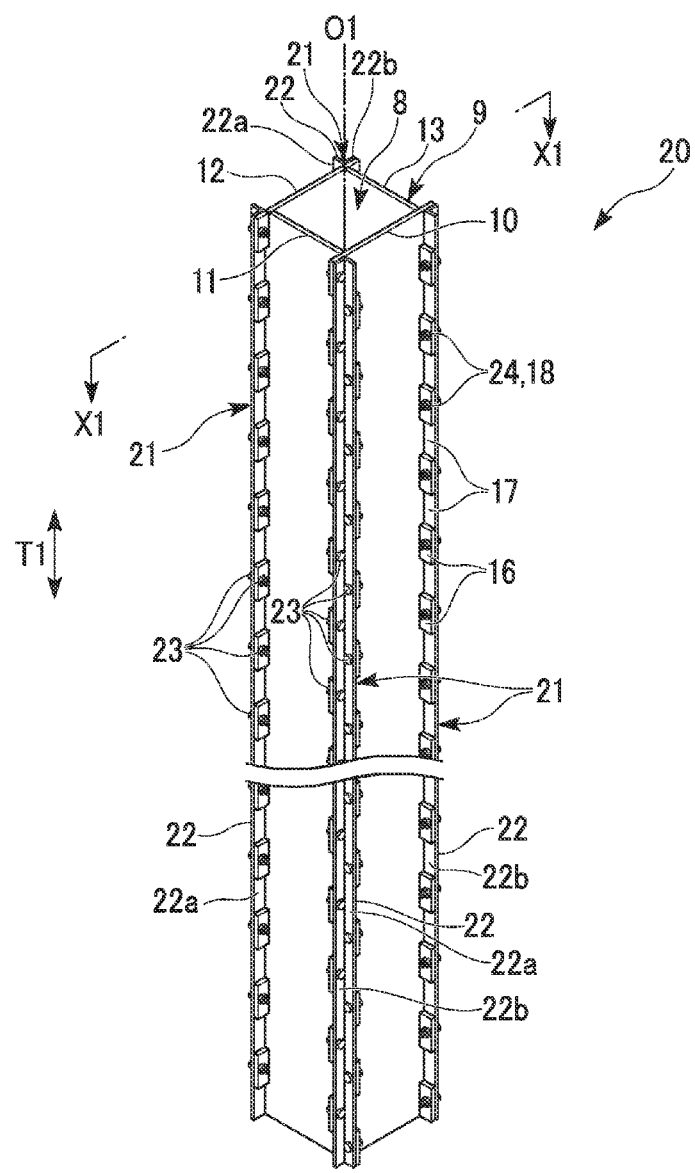
FIG. 5 is a perspective view showing a rack cell of a nuclear fuel storage rack according to a second embodiment of the present invention.
Figure 6:
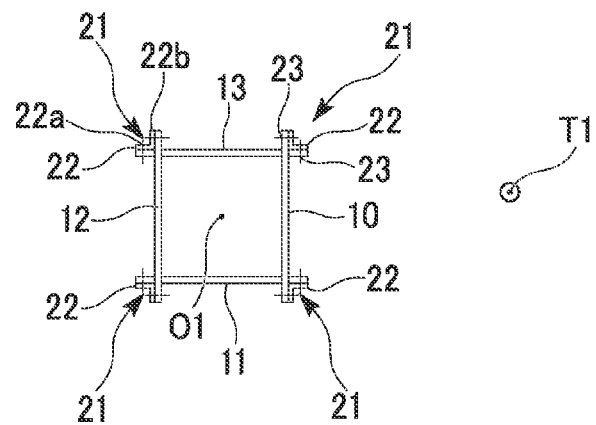
FIG. 6 is a plan view showing a rack cell of the nuclear fuel storage rack according to the second embodiment of the present invention, taken along line X1-X1 of FIG. 5.

As shown in FIGS. 5 and 6, like the first embodiment, a rack cell 20 of the embodiment includes a cell body 9 constituted by a plurality of sidewall plates 10 to 13 configured to form a nuclear fuel housing space 8 configured to house a nuclear fuel assembly 7, and a fastening mechanism 21 configured to fasten the plurality of sidewall plates 10 to 13 of the cell body 9.

Similar to the first embodiment, in the cell body 9, the nuclear fuel housing space 8 is formed in a cross-sectional square shape using the four sidewall plates 10 to 13. In addition, the sidewall plates 10 to 13 are formed using a material having good neutron absorption performance (a radiation absorption material) such as boron-added stainless steel, boron (boron carbide)-added aluminum, a gadolinium-added ferroalloy or nonferrous metal, or a boron- and gadolinium-added ferroalloy or nonferrous metal.

The sidewall plates 10 to 13 of the embodiment are formed by the projections 16 and the concave sections 17 alternately disposed in the upward/downward direction T1 at one side and the other side Then, in the cell body 9, the neighboring sidewall plates 10 and 11, 11 and 12, 12 and 13, and 13 and 10 are perpendicular to each other, and the projections 16 and the concave sections 17 are engaged with each other, assembling the four sidewall plates 10 to 13. Accordingly, the nuclear fuel housing space 8 having a cross-sectional square shape is formed.

In the embodiment, the fastening mechanism 21 includes an L-shaped metal jig 22, and a fastener 23. The L-shaped metal jig 22 is formed in a cross-sectional L shape. In addition, each of one side section 22a and the other side section 22b perpendicular to the one side section 22a has substantially the same length as a length from base ends of the projections 16 of the sidewall plates 10 to 13 to projection direction tip ends. Further, the L-shaped metal jig 22 of the embodiment is formed such that a length (height) in a direction of an axis O1 has substantially the same dimension as a height of the sidewall plates 10 to 13. Furthermore, a plurality of through-holes 24 are formed at the one side section 22a and the other side section 22b of the L-shaped metal jig 22 at predetermined intervals in the direction of the axis O1.

In the fastening mechanism 21, the L-shaped metal jigs 22 are installed at four corner sections of the cell body 9 in which the neighboring sidewall plates 10 and 11, 11 and 12, 12 and 13, and 13 and 10 are perpendicular to each other and the projections 16 and the concave sections 17 are engaged to assemble the four sidewall plates 10 to 13. Here, the L-shaped metal jig 22 is installed to match an upper end and a lower end thereof to height positions of the upper ends and the lower ends of the sidewall plates 10 to 13 and match angled sections to corner sections. Further, the L-shaped metal jig 22 is installed by bringing the outer surface of the one side section 22a in contact with one projection 16 protruding outward from the outer surface of one of the sidewall plates 10 to 13 and bringing the outer surface of the other side section 22b in contact with the other projection 16 perpendicular to the one projection 16 and protruding outward from the outer surface of the other of the sidewall plates 10 to 13. In addition, when the L-shaped metal jig 22 having the above-mentioned configuration is installed, the plurality of through-holes 24 formed at each of the one side section 22a and the other side section 22b of the L-shaped metal jig 22 are brought in communication with the insertion hole 18 of the projection 16 of one of the sidewall plates 10 to 13 and the insertion hole 18 of the projection 16 of the other of the sidewall plates 10 to 13.

Next, the L-shaped metal jigs 22 installed at each of four corner sections of the cell body 9 are fastened by inserting the fastener 23 such as a bolt (nut), a small screw, a rivet, or a split pin, into the insertion hole 18 of the projection 16 and a through-hole 24 of the L-shaped metal jig 22 of the sidewall plates 10 to 13 in communication with each other. Accordingly, the projections 16 of the neighboring sidewall plates 10 and 11, 11 and 12, 12 and 13, and 13 and 10 are fastened (connected) via the L-shaped metal jig 22 and the fastener 23. As a result, the four sidewall plates 10 to 13 forming the nuclear fuel housing space 8 having the cross-sectional square shape are securely and rigidly integrated to form the rack cell 20.

Then, like the first embodiment, in a nuclear fuel storage rack B of the embodiment, the projections 16 and the concave sections 17 of the sidewall plates 10 to 13 are engaged with each other, and the projections 16 protruding outward from the outer surfaces of the sidewall plates 10 to 13 are connected by the fastening mechanism 21, forming the rack cell 20 without use of welding. For this reason, concern of generating distortion due to the welding and a decrease in quality such as shielding performance of radiation like the related art can be removed. Accordingly, the nuclear fuel storage rack B having high reliability can be realized.

In addition, the rack cell 20 is formed by engaging and assembling the projections 16 and the concave sections 17 of the sidewall plates 10 to 13 and protruding the projections 16 outward from the outer surfaces of the sidewall plates 10 to 13. For this reason, in a state in which the rack cell 20 is housed in the nuclear fuel storage rack B and stored in water, water is disposed between the neighboring rack cells 20 as a moderator for moderating the fast neutrons.

Accordingly, the neutrons are absorbed by the radiation absorption material of the sidewall plates 10 to 13 of the rack cell 20, and the fast neutrons can be moderated using the water as a water trap. As a result, critical safety can be secured.

Next, a nuclear fuel storage rack according to a third embodiment of the present invention will be described with reference to FIGS. 7 to 10. Only the configuration of the rack cell of the embodiment is distinguished from the first and second embodiments. Accordingly, in the embodiment, the same elements in the first and second embodiments are designated by the same reference numerals, and detailed description thereof will be omitted.

Figure 7:
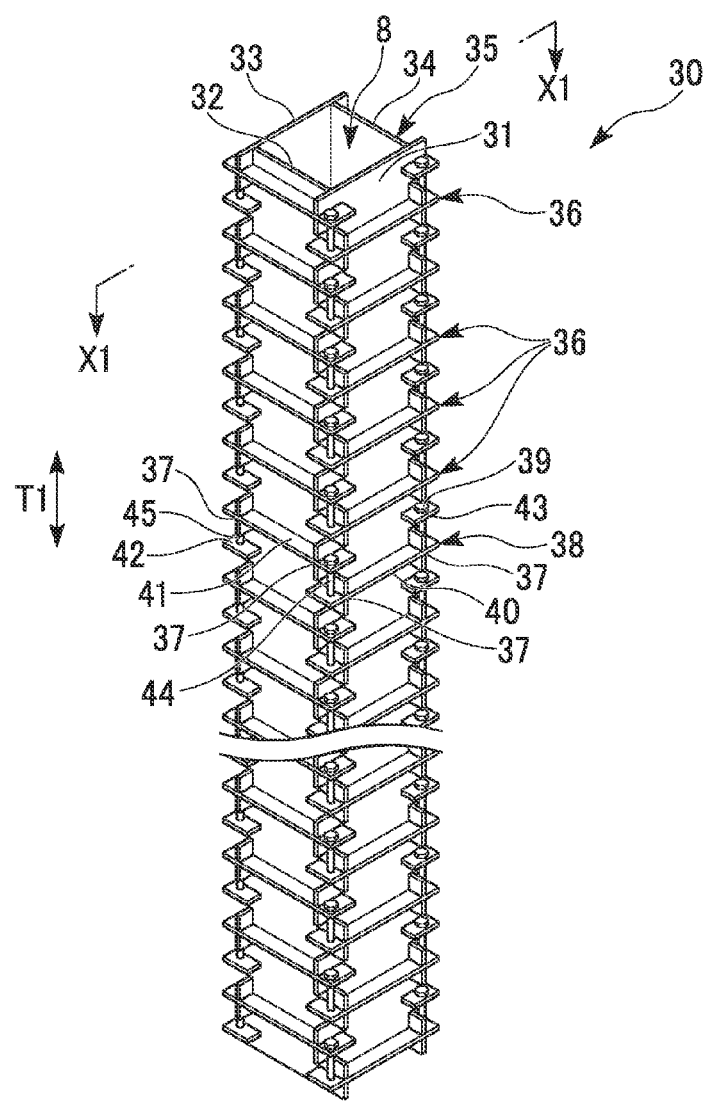
FIG. 7 is a perspective view showing a rack cell of a nuclear fuel storage rack according to a third embodiment of the present invention.

As shown in FIG. 7, a rack cell 30 of the embodiment includes a cell body 35 constituted by a plurality of sidewall plates (plate members) 31 to 34 forming the nuclear fuel housing space 8 configured to house the nuclear fuel assembly 7, and a fastening mechanism 36 configured to fasten the plurality of sidewall plates 31 to 34 of the cell body 35.

In the cell body 35, the nuclear fuel housing space 8 is formed in a cross-sectional square shape using four sidewall plates 31 to 34. In addition, the sidewall plates 31 to 34 are formed using a material having good neutron absorption performance (a radiation absorption material) such as boron-added stainless steel, boron (boron carbide)-added aluminum, a gadolinium-added ferroalloy or nonferrous metal, or a boron- and gadolinium-added ferroalloy or nonferrous metal.

Figure 8:
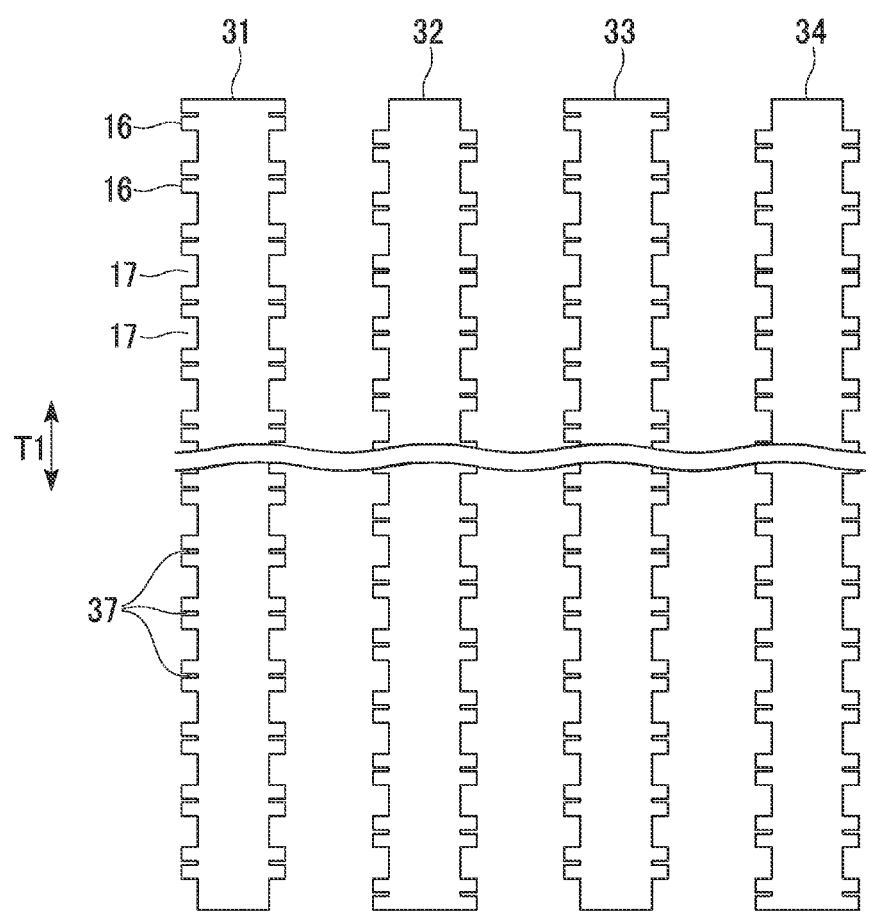
FIG. 8 is a front view showing a sidewall plate (a plate member) of the rack cell of the nuclear fuel storage rack according to the third embodiment of the present invention.

As shown in FIGS. 7 and 8, each of the sidewall plates 31 to 34 includes the projection 16 and the concave section 17 disposed at one side and the other side and alternately disposed in the upward/downward direction T1.

First and second sidewall plates 31 and 33 and third and fourth sidewall plates 32 and 34 are formed to slide disposition of the projection 16 and the concave section 17.

In the sidewall plates 31 to 34 of the embodiment, each of the projections 16 is formed to have a slit (a groove) 37 extending from a tip end to a base end side thereof. In addition, the slit 37 is formed at a substantially center portion in a height direction (a length direction) of each of the projections 16. Then, like the first and second embodiments, the four sidewall plates 31 to 34 of the cell body 35 are assembled by allowing the neighboring sidewall plates 31 and 32, 32 and 33, 33 and 34, and 34 and 31 to be perpendicular to each other and engaging the projections 16 and the concave sections 17 with each other. Accordingly, the nuclear fuel housing space 8 having a cross-sectional square shape is formed.

Figure 9:
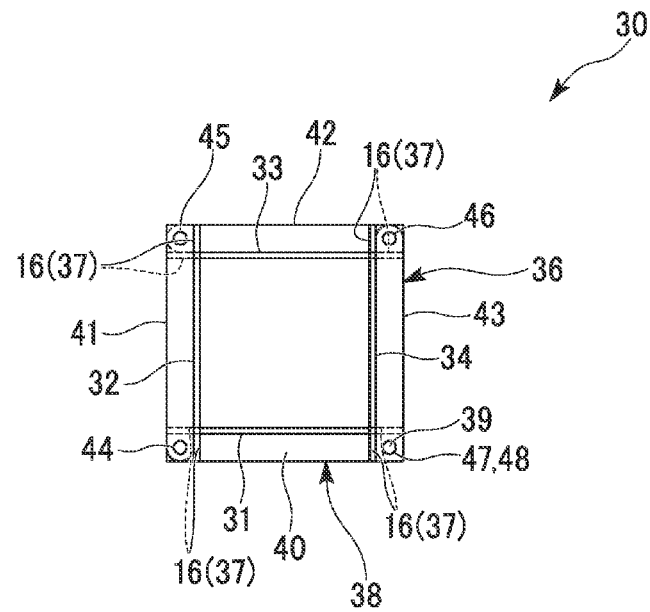
FIG. 9 is a plan view showing the rack cell of the nuclear fuel storage rack according to the third embodiment of the present invention, taken along line X1-X1 of FIG. 7.
Figure 10:
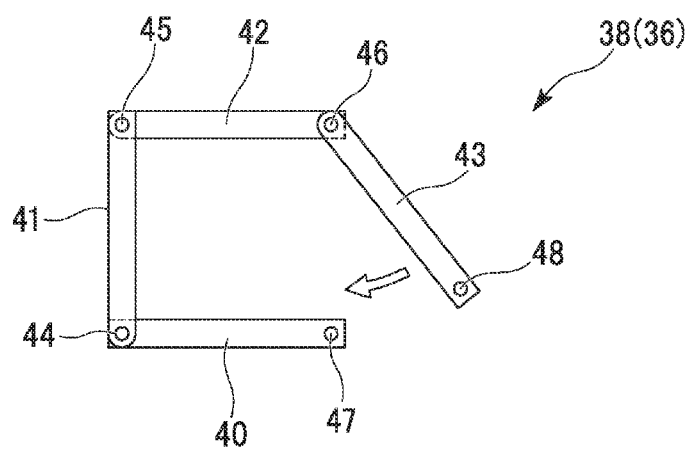
FIG. 10 is a plan view showing a lash metal jig (a fastening mechanism) of the rack cell of the nuclear fuel storage rack according to the third embodiment of the present invention.

As shown in FIGS. 7, 9 and 10, the fastening mechanism 36 of the embodiment includes a plurality of lash metal jigs 38 and fasteners 39. The lash metal jig 38 is formed using stainless steel or a material having good neutron absorption performance. The lash metal jig 38 includes four lash plates 40, 41, 42 and 43 having a rectangular plate shape, and three hinges 44, 45 and 46 configured to pivotally connect the lash plates 40 to 43. In addition, the lash metal jig 38 is formed to pivotally connect one end of a first lash plate 40 and the other end of a second lash plate 41 at a first hinge 44, one end of the second lash plate 41 and the other end of a third lash plate 42 at a second hinge 45, and one end of the third lash plate 42 and the other end of a fourth lash plate 43 at a third hinge 46, about a pivot shaft extending in the upward/downward direction T1.

The first lash plate 40 is connected to a lower end of a rotary pin of the first hinge 44, the third lash plate 42 is connected to a lower end of a rotary pin of the second hinge 45, the first lash plate 40 and the third lash plate 42 are disposed at the same height position in the upward/downward direction T1, and the lash metal jig 38 is formed. Further, the second lash plate 41 is connected to upper ends of the rotary pin of the first hinge 44 and the rotary pin of the second hinge 45, a lower end of a rotary pin of the third hinge 46 is connected to the third lash plate 42, and the fourth lash plate 43 is connected to the upper end of the rotary pin of the third hinge 46. Accordingly, the lash metal jig 38 is formed by disposing the second lash plate 41 and the fourth lash plate 43 at the same height position in the upward/downward direction T1 and at a position higher than the first lash plate 40 and the third lash plate 42 by a length of the rotary pin.

In a state in which the projection 16 and the concave section 17 are engaged and the four sidewall plates 31 to 34 are assembled to form the cell body 35, the lash metal jig 38 is formed such that an interval between the slits 37 of the vertically neighboring projections 16 is equal to an interval in the upward/downward direction T1 between the first lash plate 40 and the third lash plate 42 and the second lash plate 41 and the fourth lash plate 43.

Through-holes 47 and 48 are formed in the other end side of the first lash plate 40 and one end side of the fourth lash plate 43, respectively. Then, the fourth lash plate 43 is pivoted about the third hinge 46, the through-holes 47 and 48 of the first lash plate 40 and the fourth lash plate 43 are in communication with each other, and the fastener 39 such as a bolt (nut), a small screw, a rivet or a split pin is inserted into the through-holes 47 and 48. Accordingly, the other end of the first lash plate 40 is connected to one end of the fourth lash plate 43.

In a step in which the projection 16 and the concave section 17 are engaged and the four sidewall plates 31 to 34 are assembled to form the cell body 35, the first lash plate 40 and the third lash plate 42 are inserted into the slits 37 under the vertically neighboring projections 16 and the second lash plate 41 is inserted into an upper side of the slit 37, while pivoting about the first hinge 44 and the second hinge 45. Further, the fourth lash plate 43 is pivoted about the third hinge 46, the fourth lash plate 43 is inserted into the upper side of the slit 37, the fastener 39 is inserted into the through-holes 47 and 48 of the first lash plate 40 and the fourth lash plate 43, which are in communication with each other, and the first lash plate 40 and the fourth lash plate 43 are connected.

Accordingly, the projections 16 of the neighboring sidewall plates 31 and 32, 32 and 33, 33 and 34, and 34 and 31 are fastened (connected) by the lash plates 40 to 43. As a result, the four sidewall plates 31 to 34 forming the nuclear fuel housing space 8 having a cross-sectional square shape are securely and rigidly lashed and integrated, and thus the rack cell 30 is formed. In addition, in the embodiment, as shown in FIG. 7, bolts and nuts are used as the first hinge 44, the second hinge 45 and the third hinge 46 (rotary pins of hinges 44, 45 and 46). Then, when the hinges 44, 45 and 46 are configured using the bolts and nuts, secure fastening becomes possible. For this reason, the shape of the cell body 35 can be rigidly maintained by the fastening. As a result, material handling can also be easily performed.

Then, like the first and second embodiments, in the nuclear fuel storage rack C of the embodiment, the projections 16 and the concave sections 17 of the sidewall plates 31 to 34 are engaged, the projections 16 protruding outward from the outer surfaces of the sidewall plates 31 to 34 are connected by the fastening mechanism 36, and thus the rack cell 30 can be formed without use of welding. For this reason, concern of generating distortion due to the welding and a decrease in quality such as shielding performance of radiation like the related art can be removed. Accordingly, the nuclear fuel storage rack C having high reliability can be realized.

The rack cell 30 is formed by engaging and assembling the projections 16 and the concave sections 17 of the sidewall plates 31 to 34 and protruding the projections 16 outward from the outer surfaces of the sidewall plates 31 to 34. For this reason, in a state in which the rack cell 30 is housed in the nuclear fuel storage rack C and stored in water, the water can be interposed between the neighboring rack cells 30 as a moderator for moderating the fast neutrons.

Accordingly, the neutrons can be absorbed by the radiation absorption material of the sidewall plates 31 to 34 of the rack cell 30, and the fast neutrons can be moderated using the water as a water trap. As a result, critical safety can be secured.

Figure 11:
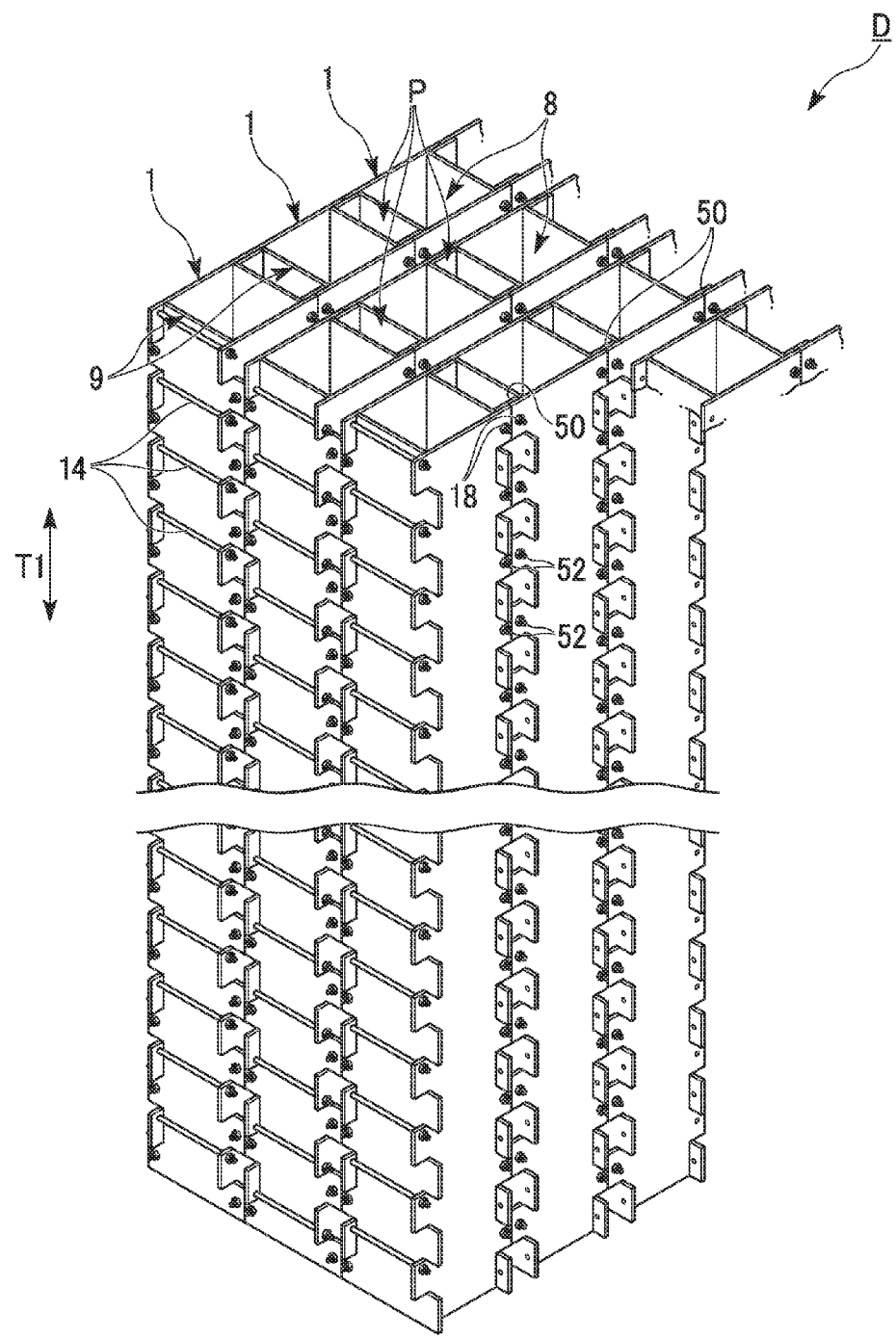
FIG. 11 is a perspective view showing a nuclear fuel storage rack according to a fourth embodiment of the present invention.
Figure 12:
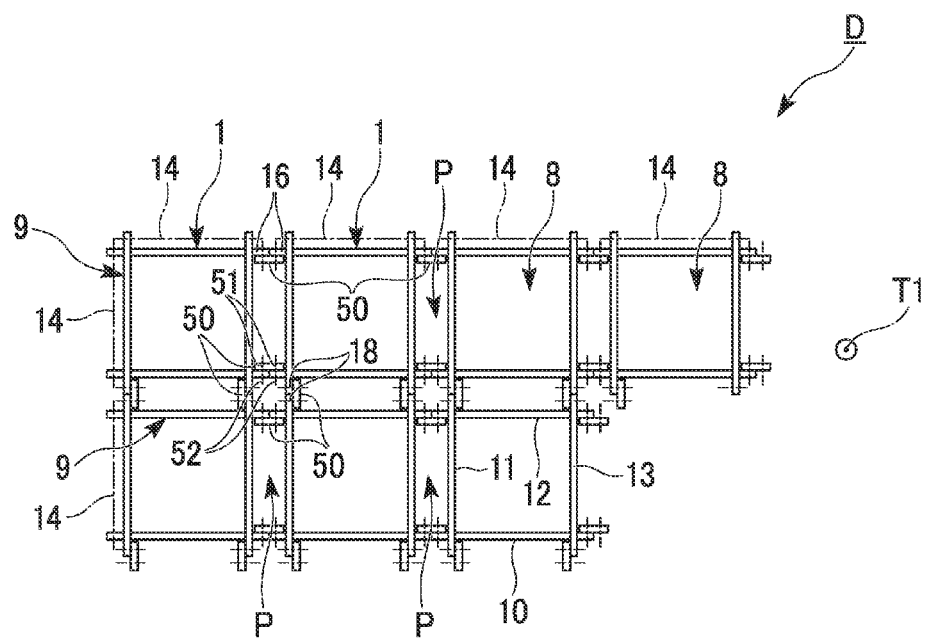
FIG. 12 is a plan view showing the nuclear fuel storage rack according to the fourth embodiment of the present invention.

Next, a nuclear fuel storage rack according to a fourth embodiment of the present invention will be described with reference to FIGS. 11 and 12. In the embodiment, the same elements as in the first to third embodiments are designated by the same reference numerals, and detailed description thereof will be omitted.

A nuclear fuel storage rack D of the present invention is constituted by the rack cell 1 configured to house the nuclear fuel assembly 7 as shown in FIGS. 1 and 2, and does not include the rack body 3 having the plurality of cell insertion holes 2 configured to house the rack cell 1. In addition, in the embodiment, the rack cell of the first embodiment is used as the rack cell 1.

The nuclear fuel storage rack D of the embodiment is constituted by longitudinally and laterally arranging a plurality of rack cells 1 in a horizontal direction and connecting the longitudinally and laterally neighboring rack cells 1. In addition, the projections 16 of the neighboring rack cells 1 disposed to match the tip ends are connected by a connecting metal jig 50 on the same straight line in a longitudinal direction and a lateral direction in the horizontal direction, and the neighboring rack cells 1 are connected. Here, through-holes 51 in communication with communication holes 18 of the projections 16, in which the tip ends are matched, are formed in the connecting metal jig 50. Then, as the connecting metal jig 50 is disposed at a predetermined position to bring the through-holes 51 in communication with the communication holes 18 of the projections 16 and a fastener 52 such a bolt (nut), a small screw, a rivet, or a split pin is inserted thereinto, the projections 16 of the neighboring rack cells 1 and the connecting metal jigs 50 are fastened. Accordingly, the neighboring rack cells 1 are connected via the connecting metal jig 50 and the fastener 52, and the plurality of rack cells 1 longitudinally and laterally arranged in the horizontal direction are integrally connected to form the nuclear fuel storage rack D of the embodiment.

The nuclear fuel storage rack D of the embodiment having the above-mentioned configuration is stored and preserved in water (a boric acid solution or pure water) in a storage pit of a nuclear fuel storage facility in a state in which the nuclear fuel assembly 7 is housed in the nuclear fuel housing space 8 of each of the rack cells 1. Then, here, the rack cell 1, in particular, the nuclear fuel storage rack D, can be formed without use of welding. For this reason, concern of generating distortion due to the welding and a decrease in quality such as shielding performance of radiation as in the related art is removed.

The rack cell 1 engages the projections 16 and the concave sections 17 of the sidewall plates 10 to 13, the projections 16 protrude outward from the outer surfaces of the sidewall plates 10 to 13, the projections 16 of the neighboring rack cells 1, in which the tip ends are matched, are connected by the connecting metal jig 50 and the fastener 52, and the nuclear fuel storage rack D is formed. For this reason, the space P is formed between the outer surfaces of the opposite sidewall plates 10 to 13 of the rack cell 1 by the projections 16. Accordingly, in a state in which the nuclear fuel storage rack D of the embodiment constituted by the plurality of rack cells 1 configured to house the nuclear fuel assembly 7 is stored in water, the nuclear fuel housing spaces 8 of the rack cells 1 are filled with water, and the space P between the opposite sidewall plates 10 to 13 of the neighboring rack cells 1 is also filled with water.

The space P between the opposite sidewall plates 10 to 13 of the neighboring rack cells 1 is filled with water. Accordingly, the fast neutrons discharged from the nuclear fuel assembly 7 are moderated to be converted into thermal neutrons, and the neutrons are absorbed by the radiation absorption material such as boron, gadolinium, or the like, which is added to the sidewall plates 10 to 13.

In addition, the neutrons are absorbed by the radiation absorption material of the sidewall plates 10 to 13 of the rack cell 1, and the fast neutrons are moderated by water in the space P between the opposite sidewall plates 10 to 13 of the neighboring rack cells 1. Accordingly, an influence on the nuclear fuel housed in the neighboring rack cells 1 toward a critical value due to the fast neutrons can be securely prevented.

Accordingly, in the nuclear fuel storage rack D of the embodiment, the projections 16 and the concave sections 17 of the sidewall plates 10 to 13 are engaged, the projections 16 protruding outward from the outer surfaces of the sidewall plates 10 to 13 are connected by the fastening mechanisms 14 and 52, and the plurality of rack cells 1 formed without use of welding are connected and formed. For this reason, concern of generating distortion due to the welding and a decrease in quality such as shielding performance of radiation like the related art is removed. Accordingly, the nuclear fuel storage rack D having high reliability can be realized.

In addition, the rack cell 1 is formed by engaging and assembling the projections 16 and the concave sections 17 of the sidewall plates 10 to 13 and protruding the projections outward from the outer surfaces of the sidewall plates 10 to 13. For this reason, in a state in which the nuclear fuel storage rack D is stored in water, the water can be interposed between the neighboring rack cells 1 as a moderator for moderating the fast neutrons. Accordingly, the neutrons are absorbed by the radiation absorption material of the sidewall plates 10 to 13 of the rack cell 1, and the fast neutrons can be moderated using the water as a water trap. As a result, critical safety can be secured.

Next, a nuclear fuel storage rack of a fifth embodiment of the present invention will be described with reference to FIG. 13. The embodiment relates to a nuclear fuel storage rack including the same configuration as in the fourth embodiment. For this reason, in the embodiment, the same elements as in the fourth embodiment are designated by the same reference numerals, and detailed description thereof will be omitted.

Figure 13:
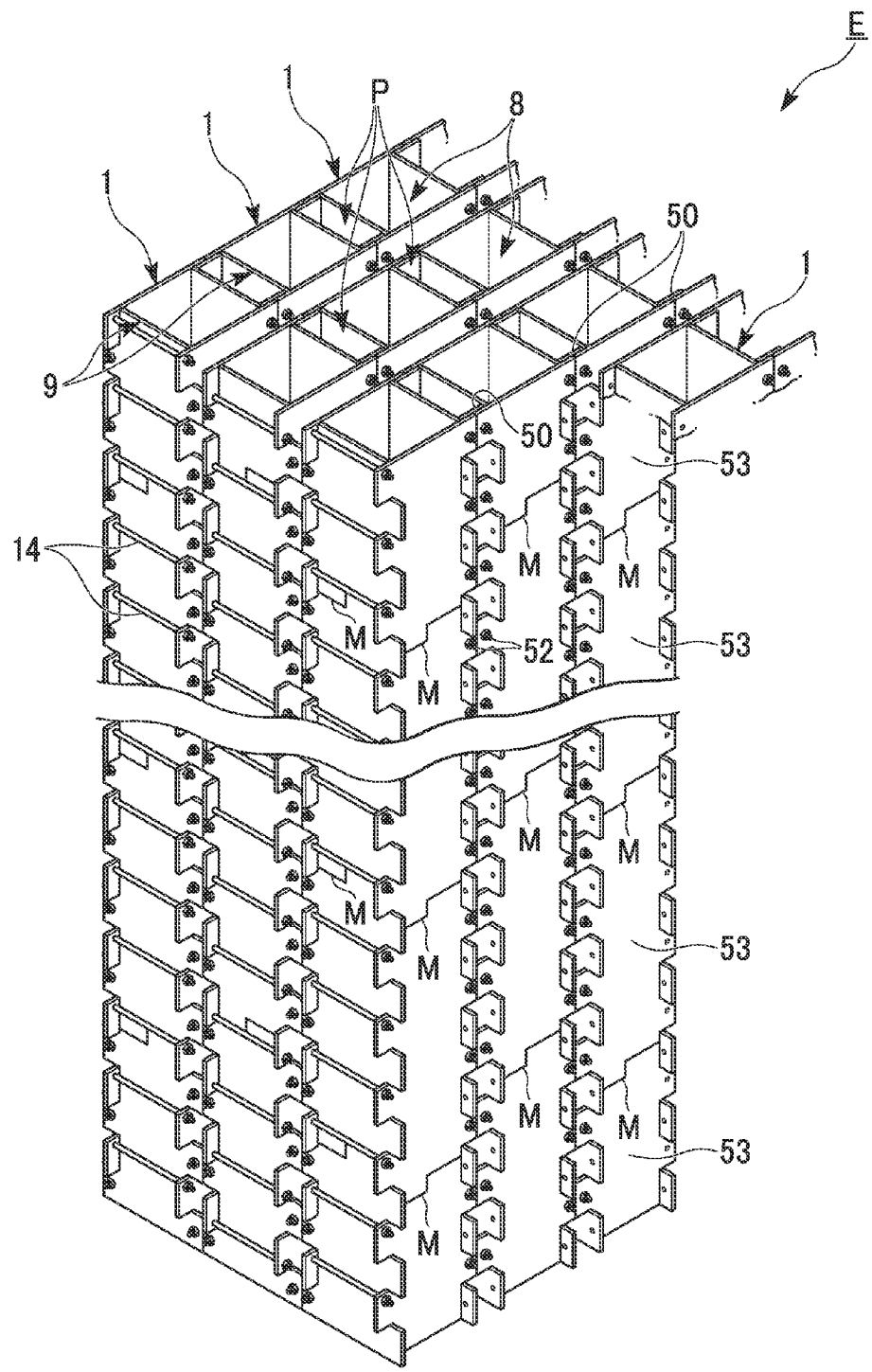
FIG. 13 is a perspective view showing a nuclear fuel storage rack according to a fifth embodiment of the present invention.

As shown in FIG. 13, a nuclear fuel storage rack E of the embodiment is configured by longitudinally and laterally arranging a plurality of rack cells 1 in a horizontal direction and longitudinally and laterally connecting the neighboring rack cells 1.

As the projections 16 of the neighboring rack cells 1 disposed to match the tip ends with each other are connected by the connecting metal jig 50 on the same straight line in a longitudinal direction and a lateral direction in the horizontal direction, the neighboring rack cells 1 can be connected.

The nuclear fuel storage rack E of the embodiment is formed such that the rack cells 1 can be divided in plural in a height direction thereof. Then, in the embodiment, for example, the rack cell 1 having a height of 4 to 5 m is formed such that the height of the rack cell 1 can be divided in plural heights of divided cells. Further, here, the joining point M of the vertically neighboring divided cells 53 has a step shape, and the rack cell 1 is formed. In addition, the joining points M of the neighboring rack cells 1 are disposed at different heights in the upward/downward direction T1, i.e., the height of the joining point M of the neighboring rack cells 1 is delayed, and the rack cells 1, in particular, the nuclear fuel storage rack E, is formed.

In the fourth embodiment (like the first to third embodiments), the rack cell 1 is long in a height direction T1, and the nuclear fuel housing space 8 is narrow so that a human cannot enter. For this reason, in the rack cell 1 of the fourth embodiment, a special tool is needed to fasten the fastener 52 in a deep area.

In the nuclear fuel storage rack E of the embodiment, the rack cell 1 is formed to be divided. For this reason, in addition to the effects described in the first to fourth embodiments, the divided cells 53 can be sequentially stacked and connected by the fasteners 52 and 14, and in comparison with the rack cell 1 described in the first to fourth embodiments, the rack cell 1 and further the nuclear fuel storage rack E can be easily assembled without necessity of the special tool. In addition, when it is assumed that the fastener 52 is firmly fastened by a long latchet wrench, the rack cell 1 may be formed such that the height of the divided cells 53 is about 0.2 to 1.5 m.

In addition, since the nuclear fuel storage rack E is formed by adjusting the height (offsetting the position) of the joining point M of the neighboring rack cells 1, an effect of blocking the neutrons leaked from the joining point M can be obtained.

While the first to fifth embodiments of the nuclear fuel storage rack according to the present invention have been described, the present invention is not limited to the first to fifth embodiments but may be appropriately modified without departing from the spirit of the present invention.

Figure 14:
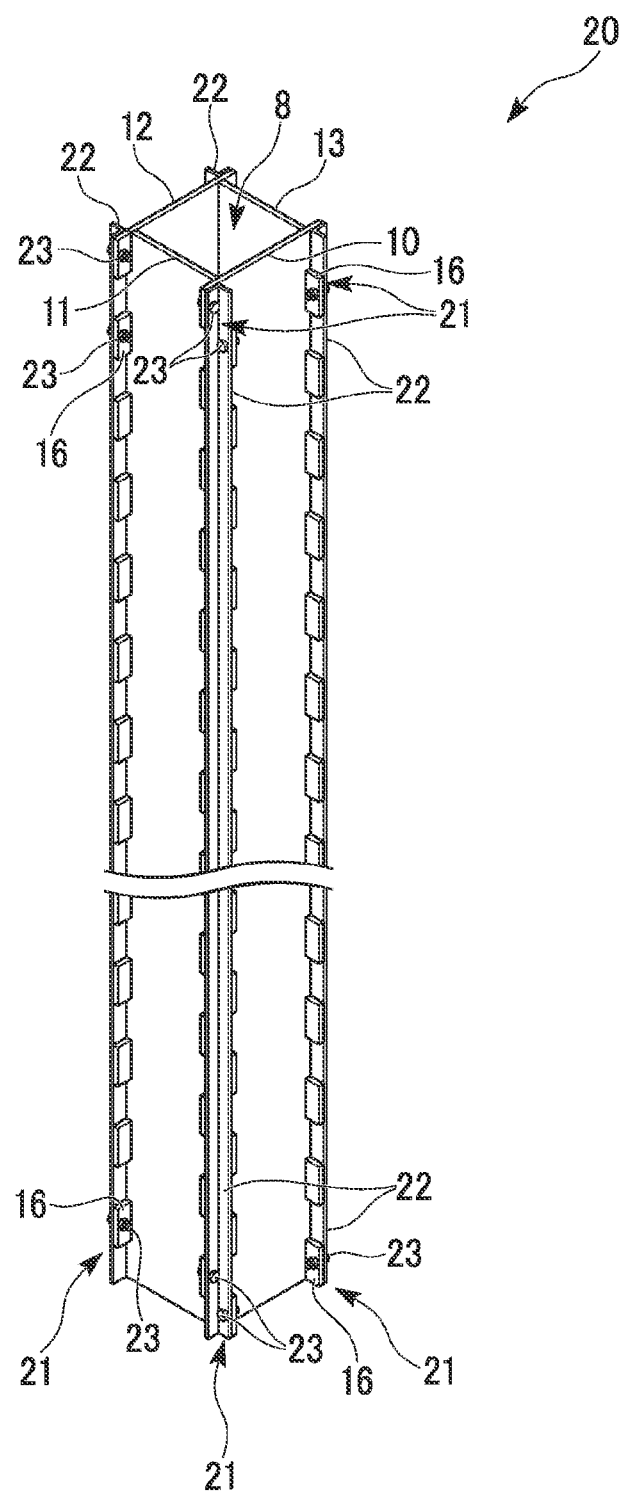
FIG. 14 is a perspective view showing a variant of the rack cell of the nuclear fuel storage rack according to the second embodiment of the present invention.

For example, in the first and second embodiments, it was described that the insertion holes 18 are formed in all of the projections 16 of the sidewall plates 10 and 11, and further, in the second embodiment, the through-holes 24 in communication with the insertion holes 18 of all of the projections 16 are formed in the L-shaped metal jigs 22, and all of the projections 16 and the L-shaped metal jigs 22 are fastened by the fasteners 23. On the other hand, for example, as shown in FIG. 14, the L-shaped metal jigs 22 and the projections 16 may be configured to be fastened by the fasteners 23 only at the upper end side and the lower end side of the rack cell 20. In addition, here, the L-shaped metal jigs may be disposed at only the upper end side and the lower end side.

Figure 15:
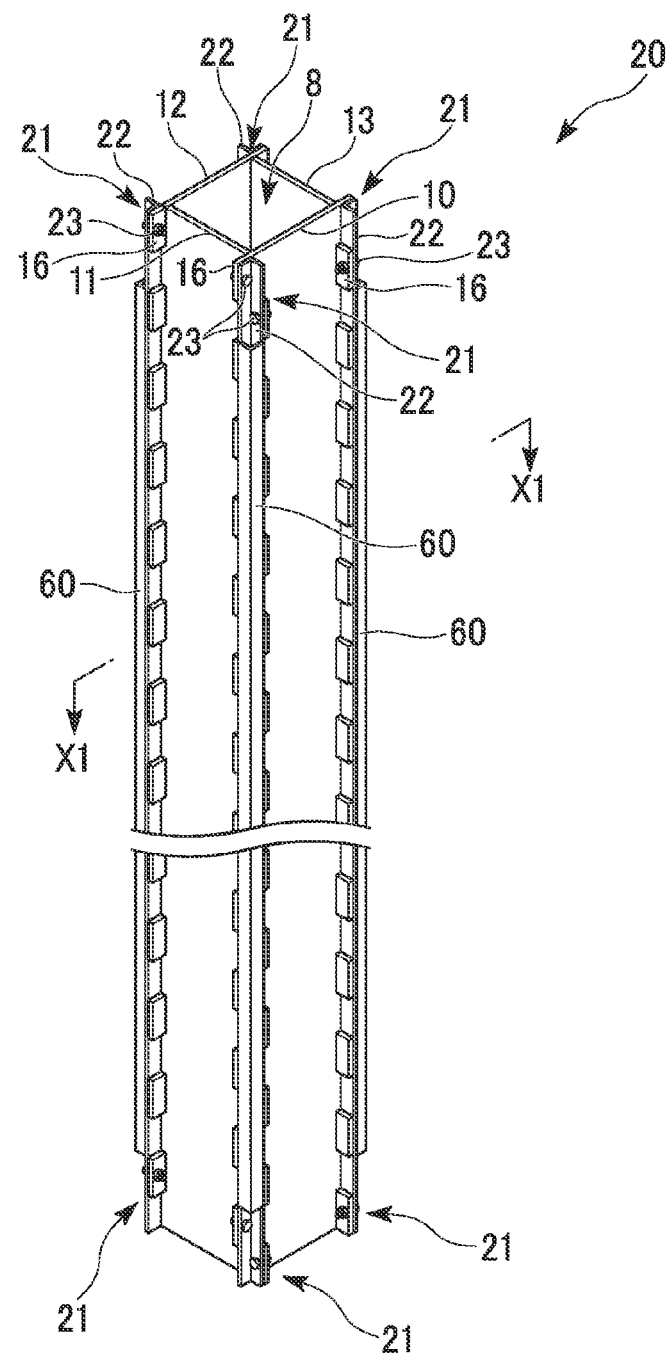
FIG. 15 is a perspective view showing a variant of the rack cell of the nuclear fuel storage rack according to the second embodiment of the present invention.
Figure 16:
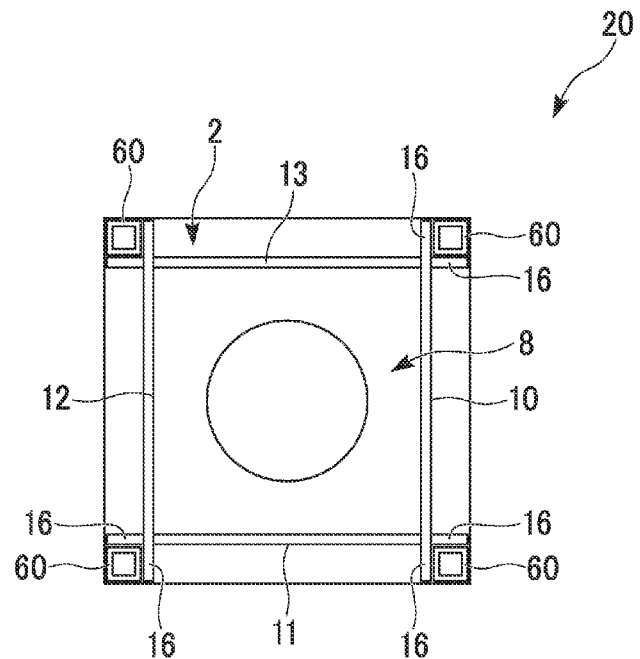
FIG. 16 is a cross-sectional view showing the variant of the rack cell of the nuclear fuel storage rack according to the second embodiment of the present invention, taken along line X1-X1 of FIG. 15.

In the case of the above-mentioned configuration, as shown in FIGS. 15 and 16, a space bar (a spacer) 60 may be inserted between the L-shaped metal jigs 22, which are vertically disposed. The space bar 60 may be a steel tube such as an angled steel tube, a steel rod, angled steel, or an X rod, but its cross-sectional shape is not limited. In addition, the space bar 60 is formed of stainless steel or a material having good neutron absorption capability.

When the rack cell 20 is inserted into the cell insertion hole 2, the space bar 60 having the above-mentioned configuration is inserted between plate members forming the cell housing section 6 of the rack body 3 and the projections 16 of the first and second sidewall plates 10 and 12, between the plate members and the projections 16 of the second and third sidewall plates 12 and 11, between the plate members and the projections 16 of the third and fourth sidewall plates 11 and 13, and between the plate members and the projections 16 of the fourth and first sidewall plates 13 and 10. Accordingly, the rack cell 20 can be stably held, and the nuclear fuel housing space 8 can be appropriately formed. In addition, the space bar 60 may be inserted into the rack cell 20 throughout the entire height thereof. In this case, the L-shaped metal jig 22 and the fastener 23 of the embodiment may be unnecessary.

In the first to fifth embodiments, it was described that the fastening mechanisms 14, 21, 23, 36, 50 and 52 are installed from the upper ends to the lower ends of the rack cells 1, 20 and 30 at predetermined intervals. On the other hand, when an external force such as an earthquake is applied to the cell body 9 from the housed nuclear fuel assembly 7, the external force is applied from the nuclear fuel assembly 7 to the cell body 9 at the height position of the grid 15 in which the spent nuclear fuel rods are bundled. For this reason, the fastening mechanisms 14, 21, 23, 36, 50 and 52 may be disposed only at substantially the same height position as the grid 15 of the nuclear fuel assembly 7. That is, an installation position of the fastening mechanism may be appropriately selected.

Figure 17:
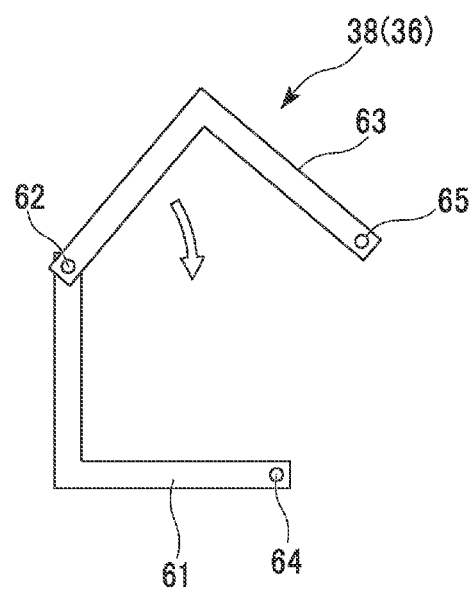
FIG. 17 is a plan view showing a variant of the lash metal jig (the fastening mechanism) of the rack cell of the nuclear fuel storage rack according to the third embodiment of the present invention.

In the third embodiment, the lash metal jig 38 of the fastening mechanism 36 includes the four lash plates 40 to 43, and the three hinges 44, 45 and 46 configured to pivotally connect the neighboring lash plates 40 to 43. The present invention is not limited thereto, for example, as shown in FIG. 17, a lash metal jig of a fastening mechanism may include an L-shaped first lash plate 61 when seen from a plan view, and a second lash plate 63 connected to one end of the first lash plate 61 and pivoted about a first hinge 62 at the other end, and may be configured to fix the cell body 35 by inserting the fastener 39 into through-holes 64 and 65 formed in the other end side of the first lash plate 61 and one end side of the second lash plate 63.

In the fourth and fifth embodiments, it was described that the plurality of the rack cells 1 of the first embodiment are longitudinally and laterally arranged in the horizontal direction, and the neighboring rack cells 1 are longitudinally and laterally connected to form the nuclear fuel storage racks D and E. The present invention is not limited thereto, as in the fourth and fifth embodiments, the plurality of rack cells 20 and 30 of the second and third embodiments may be connected to form the nuclear fuel storage rack.

Figure 18:
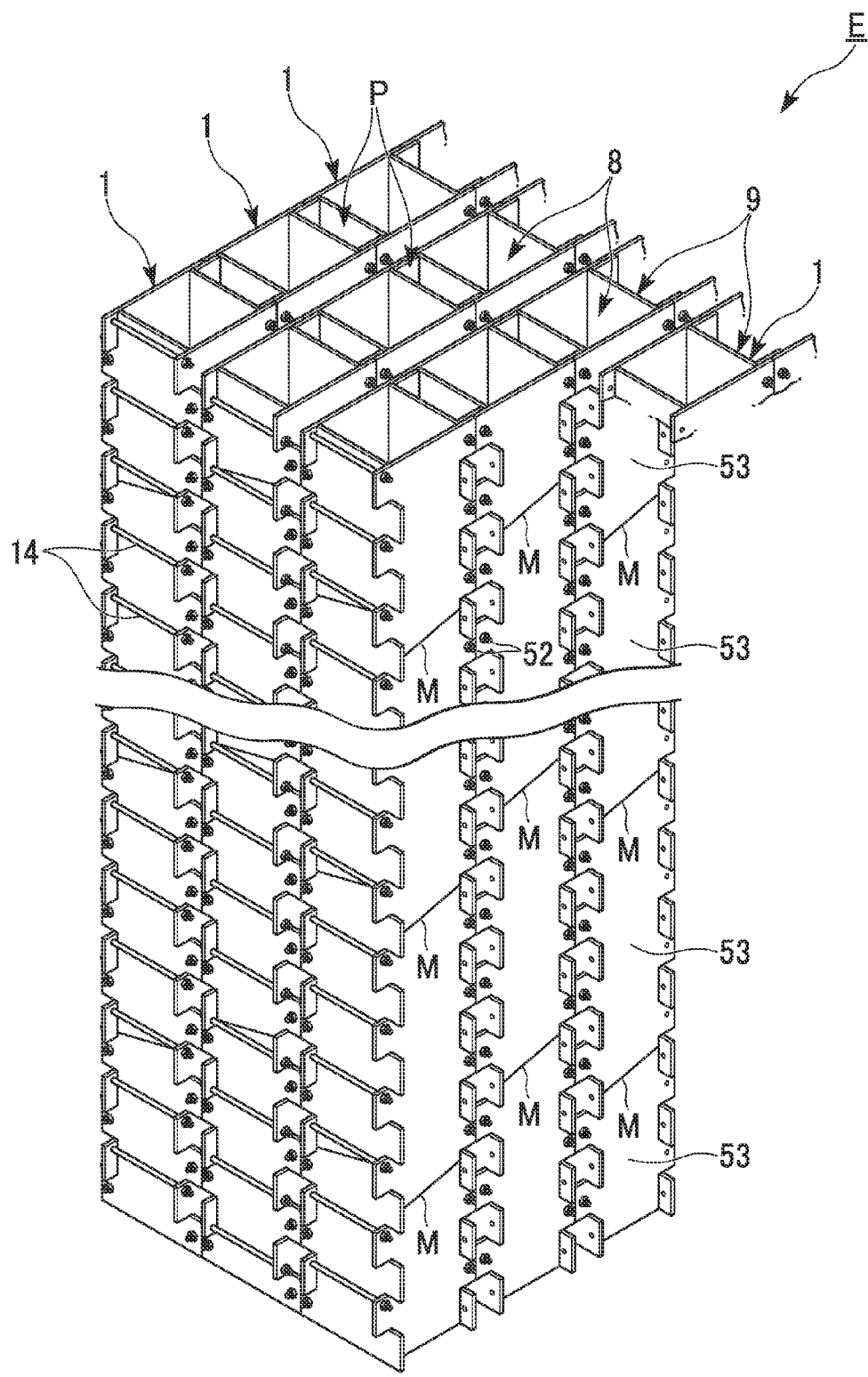
FIG. 18 is a perspective view showing a variant of the nuclear fuel storage rack according to the fifth embodiment of the present invention.

In the fifth embodiment, the joining point M of the divided cells 53, which are vertically neighbored, has a step shape, and the rack cell 1 is formed. The present invention is not limited thereto, the joining point M of the divided cells 53 may have an arbitrary shape, and for example, as shown in FIG. 18, the joining point M may be formed to be inclined. In addition, the joining point M may be formed to have different shapes according to the sidewall plates 10 to 13 of the rack cell 1. Even in this case, as in when the position of the joining point M of the neighboring rack cells 1 is slid, an effect of blocking the neutrons leaked from the joining point M can be obtained.

The present invention may include modifications, and may be configured by appropriately assembling the configurations of the first to fifth embodiments.

INDUSTRIAL APPLICABILITY

According to the nuclear fuel storage rack of the embodiment, the rack cell can be formed by engaging the projections and the concave sections of the plate members and connecting the projections protruding outward from the outer surfaces of the plate members by the fastening mechanism without use of welding. For this reason, concern of generating distortion due to the welding and a decrease in quality such as shielding performance of radiation as in the related art can be removed. As a result, the nuclear fuel storage rack having high reliability can be realized.

In addition, the rack cell is formed by engaging and assembling the projections and the concave sections of the plate members and protruding the projections outward from the outer surfaces of the plate members. For this reason, when the nuclear fuel storage rack is stored in water, the water is interposed between the neighboring rack cells as the moderator for moderating the fast neutrons. Accordingly, the neutrons can be absorbed by the radiation absorption material of the plate members of the rack cell, and the fast neutrons can be moderated using the water as a water trap. As a result, critical safety can be secured.

DESCRIPTION OF REFERENCE NUMERALS

1: rack cell
2: cell insertion hole
3: rack body
4: base plate
5: support leg
6: cell housing section
7: nuclear fuel assembly
8: nuclear fuel housing space
9: cell body
10: sidewall plate (plate member)
11: sidewall plate (plate member)
12: sidewall plate (plate member)
13: sidewall plate (plate member)
14: fastening mechanism
15: grid
16: projection
17: concave section
20: rack cell
21: fastening mechanism
22: L-shaped metal jig
23: fastener
24: through-hole
30: rack cell 31: sidewall plate (plate member)
32: sidewall plate (plate member)
33: sidewall plate (plate member)
34: sidewall plate (plate member)
35: cell body
36: fastening mechanism
37: slit
38: lash metal jig
39: fastener
40: lash plate
41: lash plate
42: lash plate
43: lash plate
44: hinge
45: hinge
46: hinge
47: through-hole
48: through-hole
50: connecting metal jig
51: through-hole
52: fastener
53: divided cell
60: space bar
A: nuclear fuel storage rack
B: nuclear fuel storage rack
C: nuclear fuel storage rack
D: nuclear fuel storage rack
E: nuclear fuel storage rack
M: joining point
O1: axis
T1: upward/downward direction (height direction)

The invention claimed is:

1. A nuclear fuel storage rack comprising a plurality of rack cells configured to house a nuclear fuel assembly,
wherein the rack cell comprises a plurality of plate members each of which having a thickness, the plurality of plate members contain a radiation absorption material and form a nuclear fuel housing space configured to house the nuclear fuel assembly, and a fastening mechanism configured to fasten the plurality of plate members,
each of the plate members comprises projections protruding outward in a lateral direction from one side end and the other side end, and concave sections formed at the one side end and the other side end by the projections, the one side end and the other side end of the plate members extend in an upward and downward direction,
a tip end of the projections and a bottom part of the concave sections are separated with a distance greater than the thickness of the plate members,
in a state in which the projections and the concave sections of the plate members which are adjacent to each other are engaged to assemble the plurality of plate members, the projections protruding outward from the outer surfaces of the plate members in the lateral direction, and
the fastening mechanism fastens the projections protruding outward from the outer surfaces of the plate members in the lateral direction with each other,
wherein the fastening mechanism comprises a plurality of lash metal jigs and fasteners,
wherein each of the lash metal jigs comprises:
a first lash plate having a rectangular plate shape, the first lash plate having a first end and a second end;
a second lash plate having a rectangular plate shape, the second lash plate having a first end and a second end;
a third lash plate having a rectangular plate shape, the third lash plate having a first end and a second end;
a fourth lash plate having a rectangular plate shape, the fourth lash plate having a first end and a second end;
a first hinge connecting the first end of the first lash plate and the second end of the second lash plate about a first pivot shaft extending in the upward and downward direction;
a second hinge connecting the first end of the second lash plate and the second end of the third lash plate about a second pivot shaft extending in the upward and downward direction;
a third hinge connecting the first end of the third lash plate and the second end of the fourth lash plate about a third pivot shaft extending in the upward and downward direction,
wherein slits are formed in the projections of the plate members,
wherein the first lash plate, the second lash plate, the third lash plate, and the fourth lash plate are fitted to the slits of the projections of the plurality of plate members,
wherein each of the fasteners connects the second end of the first lash plate and the first end of the fourth lash plate and fastens the projections,
wherein the first lash plate and the third lash plate are disposed at a same height position in the upward and downward direction,
wherein the second lash plate and the fourth lash plate are disposed at a same height position in the upward and downward direction, and
wherein the second lash plate and the fourth lash plate are disposed at a position higher than the first lash plate and the third lash plate.

2. The nuclear fuel storage rack according to claim 1, further comprising a rack body having a plurality of cell insertion holes formed by assembling a plurality of plate members in a lattice shape and longitudinally and laterally arranged in a horizontal direction, and
wherein the rack cell is inserted and housed in the cell insertion hole of the rack body.

3. The nuclear fuel storage rack according to claim 1, wherein the rack cells are longitudinally and laterally arranged in the horizontal direction, and the projections of the rack cells which are adjacent to each other are connected.

* * * * *